(12) United States Patent
Vaudenay et al.

(10) Patent No.: US 7,461,261 B2
(45) Date of Patent: Dec. 2, 2008

(54) METHOD TO GENERATE, VERIFY AND DENY AN UNDENIABLE SIGNATURE

(75) Inventors: Serge Vaudenay, Crissier (CH); Jean Monnerat, Courtetelle (CH)

(73) Assignee: Ecole Polytechnique Federale de Lausanne (EPEL), Lausanne (CH)

( * ) Notice: Subject to any disclaimer, the term of this patent is extended or adjusted under 35 U.S.C. 154(b) by 1004 days.

(21) Appl. No.: 10/777,661

(22) Filed: Feb. 13, 2004

(65) Prior Publication Data

US 2005/0193048 A1    Sep. 1, 2005

(51) Int. Cl.
*H04L 9/00* (2006.01)
*H04L 9/30* (2006.01)
*H04L 9/32* (2006.01)
*H04L 9/14* (2006.01)

(52) U.S. Cl. ................................. 713/180; 380/28
(58) Field of Classification Search ............ 380/28; 713/180
See application file for complete search history.

(56) References Cited

U.S. PATENT DOCUMENTS 5,373,558 A * 12/1994 Chaum ................ 713/180
6,292,897 B1    9/2001 Gennaro et al.

FOREIGN PATENT DOCUMENTS

| EP | 0 318 097 | 5/1989 |
|---|---|---|
| EP | 1 185 025 | 3/2002 |

OTHER PUBLICATIONS

Chaum, David. "Zero-Knowledge Undeniable Signatures (Extended Abstract)", EUROCRYPT '90.*
Menezes, Alfred J. et al. Handbook of Applied Cryptography, 1997 CRC Press, Inc., pp. 408-409, 425-438 and 451-562.*
Google Answers. "Q: Homomorphism Hash Function?", Nov. 2002, <http://answers.google.com/answers/threadview?id=100823>.*
Johnson, Robert et al. "Homomorphic Signature Schemes", 2002.*
Yun, Sung-Hyun et al. "Convertible Undeniable Signature Scheme", 1997 IEEE.*
Libert, et al., "Identity Based Undeniable Signatures", Cryptology ePrint Archive, Report 2003/206, 2003.
Gennaro, et al., "RSA-Based Undeniable Signatures", Journal of Cryptology, p. 13, 1996.
Scheidler, "A Public-Key Cryptosystem Using Purely Cubic Fields", Journal of Cryptology, 11, pp. 109-124, Springer, 1998.
Gennaro, et al., "Robust and Efficient Sharing of RSA Functions", Journal of Cryptology, vol. 13, No. 2, pp. 157-172, 1996.
Chaum, "Zero-Knowledge Undeniable Signatures—In Eurocrypt '90", LNCS 473, p. 10, Springer-Verlag, Berlin, 1991.

* cited by examiner

*Primary Examiner*—Michael J Simitoski
(74) *Attorney, Agent, or Firm*—DLA Piper US LLP

(57) ABSTRACT

The aim of the invention is to propose the generation, verification and denial of an undeniable signature which has a size smaller than the currently available undeniable signatures, i.e. less than 80 bits. This aim is achieved by the method to generate an undeniable signature $(y_1, \ldots, y_t)$ on a set of data, this method comprising the following steps: (1) transforming the set of data (m) to a sequence of a predetermined number (t) of blocks $(x_1, \ldots, x_t)$, these blocks being members of an Abelian group, this transformation being a one way function, and (2) applying to each block $(x_i)$ a group homomorphism (f) to obtain a resulting value $(y_i)$, in which the number of elements of the initial group (G) is larger than the number of elements (d) of the destination group (H).

13 Claims, No Drawings

METHOD TO GENERATE, VERIFY AND DENY AN UNDENIABLE SIGNATURE

FIELD OF THE INVENTION

This invention concerns the field of electronic signatures, in particular the concept of undeniable signature. By undeniable signature, it is meant signatures which are non-self-authenticating, i.e. where signatures can only be verified with the signer's consent. However, if a signature is only verifiable with the aid of a signer, a dishonest signer may refuse to authenticate a genuine document. Undeniable signatures solve this problem by adding a new component called the denial protocol in addition to the normal components of signature and verification.

BACKGROUND ART

An undeniable signature is a cryptographic scheme similar to a classical digital signature except that the recipient of a message cannot verify its validity using only the public key of the signer: he needs also to interact with this one in order to be convinced of validity of the signature. This opposes to the so called universal verifiability of classical digital signatures where anybody knowing the signer's public key is able to verify the signature at any time. In some applications such as signing a contract it is desirable to keep the signer's privacy by limiting the ability to verify this signature. However, an undeniable signature does not abandon the non repudiation property. Indeed, in the case of a dispute the signer could be compelled by an authority to prove the invalidity of a signature, otherwise this would be considered as an attempt of denying a valid signature. As a side benefit, undeniable signature could in principle be arbitrarily small e.g. as small as a MAC, although no such signatures were proposed so far. An undeniable signature scheme is composed of a signature generation algorithm, a confirmation protocol to prove the validity of a signature and a denial protocol in order to prove the invalidity of an alleged non signature. These two protocols often consist of an interactive proof.

Since the invention of the first undeniable signature scheme proposed by D. Chaum [see EP 0 318 097], a certain amount of work has been dedicated to its development and different improvements. Until the proposition of an undeniable signature scheme based on RSA by Gennaro et al. [U.S. Pat. No. 6,292,897], all the other undeniable signatures were based on the discrete logarithm problem. More recently, two undeniable signatures based on different problems have been proposed. The first one is based on pairings [B. Libert & J-J Quisquater "Identity based undeniable signatures" Cryptology ePrint Archive, Report 2003/206, 2003] and the second one is based on a quadratic field [see EP 1 185 025].

AIM OF THE INVENTION

The aim of the invention is to propose an undeniable signature which has a size smaller than the currently available undeniable signatures, i.e. less than 80 bits. The size could be an issue in several applications such as bank payments, in which the card holder wish to keep a trace of each transaction in the card.

This aim is achieved by the method as claimed in the claim 1.

In the present application, we provide a new computational problem called Group Homomorphism Interpolation Problem (GHIP) whose solution consists in finding some images of some given points under an homomorphism already interpolated by some given points. We then explain some links of GHIP with some known problems in cryptography.

DETAILED DESCRIPTION OF THE INVENTION

Problem Definitions: Given two Abelian groups G and H, we say that a set of points $\{(x_1,y_1), \ldots, (x_s,y_s)\} \subseteq G \times H$ interpolates in a group homomorphism if there exists a group homomorphism $f: G \to H$ such that $f(x_i) = y_i$ for $i=1, \ldots, s$. We say that a set of points $B \subseteq G \times H$ interpolates in a group homomorphism with another set of points $A \subseteq G \times H$ if $A \cup B$ interpolates in a group homomorphism. We state here the Group Homomorphism Interpolation problem (GHI problem) and its decisional problem (GHID problem).

GHI Problem (Group Homomorphism Interpolation Problem)

Parameters: two Abelian groups G and H, a set of s points $A \subseteq G \times H$.

Input: $x_1, \ldots, x_t \in G$.

Problem: find $y_1, \ldots, y_t \in H$ such that $\{(x_1,y_1), \ldots, (x_t,y_t)\}$ interpolates with A in a group homomorphism.

GHID Problem (Group Homomorphism Interpolation Decisional Problem) Parameters: two Abelian groups G and H, a set of s points $A \subseteq G \times H$. Input: a set of t points $B \subseteq G \times H$. Problem: does B interpolate with A in a group homomorphism?

We first notice that when the x-coordinates of points in A generate G then there is at most one solution. A more complete result on the uniqueness notion is exposed below.

Theorem 1. Let G, H be two finite Abelian groups. We denote d and $\lambda$ the order and exponent of H respectively. Let $x_1, \ldots, x_s \in G$ which span G'. The following properties are equivalent. In this case, we say that $x_1, \ldots x_s$ H-generate G.

1. For all $y_1, \ldots, y_s \in H$, there exists at most one group homomorphism $f: G \to H$ such that $f(x_i) = y_i$ for all $i=1, \ldots s$.

2. There exists a unique group homomorphism $\phi: G \to H$ such that $\phi(x_i) = 0$ for $i=1, \ldots, s$, namely $\phi = 0$.

3. The set Hom(G|G',H) of all group homomorphisms from G|G' to H is restricted to $\{0\}$.

4. $\gcd(\#(G|G'), d) = 1$.

5. $G' + dG = G$.

6. $G' + \lambda G = G$.

7. $x_1 \bmod dG, \ldots, x_s \bmod dG$ span G|dG.

8. $x_1 \bmod \lambda G, \ldots, x_s \bmod \lambda G$ span G|$\lambda$G.

In what follows we first wonder if $x_1, \ldots, x_s$ H-generate G. If yes we second wonder if the set of $(x_i, y_i)$ points is accepted by GHID Problem as input with (G, H) as parameters, i.e. that it interpolates in a group homomorphism. Note that this homomorphism is necessarily unique. If yes we finally consider GHI and GHID Problems with $A = \{(x_i, y_i); i=1, \ldots, s\}$.

LINKS WITH WELL KNOWN PROBLEMS

EXAMPLE 1

We take a cyclic group G of order q, $H = Z_q$, and a generator g of G. The set $A = \{(g, 1)\}$ interpolates in a group homomorphism. Finally we notice that the GHI Problem is exactly the discrete logarithm problem.

EXAMPLE 2

We take a cyclic group $G = H$, and a generator g of G. For any $a \in Z$, $A = \{(g, ag)\}$ interpolates in a group homomorphism which is the exponentiation to the power a. Finally, we notice that GHI and GHID Problems with t=1 are exactly the Diffie-Hellman problem and the decisional Diffie-Hellman problem respectively.

EXAMPLE 3

Let n=p×q such that p, q are different odd primes and H={−1, +1}. We let $x_1, x_2 \in Z_n^*$ be such that $x_1$ is a quadratic residue modulo p and not modulo q, and that $x_2$ is a quadratic residue modulo q, and not modulo p. We notice that A={$(x_1, 1), (x_2, −1)$} interpolates in a unique group homomorphism which is $$\left(\frac{\cdot}{p}\right).$$

Since it is easy to compute $$\left(\frac{\cdot}{n}\right).$$

the GHI and GHID problems are equivalent to distinguishing quadratic residues modulo n from non quadratic residues.

EXAMPLE 4

Here, we consider the well known RSA cryptosystem. Let n=pq be an RSA modulus and $G=H=Z_n^*$. Let f: $Z_n^* \to Z_n^*$ be defined by $f(x)=x^e$ mod n for an exponent e such that gcd(e, $\phi(n)$)=1. Set $d=e^{-1}$ mod$\phi(n)$. Given s pairs $(x_i^e$ mod n, $x_i) \in Z_n^* \times Z_n$ such that the first coordinates $Z_n^*$-generate $Z_n^*$, the RSA decryption problem of a challenged ciphertext is exactly the GHI problem with the parameter t=1.

EXAMPLE 5

Given d∈{2, 3, 4} and given an integer n such that d divides $\phi(n)$, we let $G=Z_n^*$ and $H=Z_d$.

EXAMPLE 6

We show here how we can apply the GHI problem to the Bilinear Diffie-Hellman Problem (BDHP) on which the identity based cryptosystem of Boneh and Franklin is based. Let ê: $G_1 \times G_1 \to G_2$ be a bilinear, non-degenerate and computable mapping, where $G_1$ and $G_2$ are cyclic groups of order of a large prime p. Let P be a generator of $G_1$, we can state the BDHP as follows: given three random elements aP, bP and $cP \in G_1$, compute $ê(P, P)^{abc}$. BDHP is equivalent to GHIP with the following parameters: A={(P, ê(aP, bP))} and $x_1$: =cP.

EXAMPLE 7

Let n=p×q such that p=rd+1 and q are prime, gcd(r, d)=1, gcd(q−1, d)=1, with d smooth. We take $G=Z_n^*$ and $H=Z_d$. We can easily compute a group homomorphism by first raising to the power r(q−1) then computing a discrete logarithm using the Pohlig-Hellman algorithm.

EXAMPLE 8

Let consider the Paillier encryption function that maps an element $(x, y) \in Z_n \times Z_n^*$ to the element $g^x \cdot y^n$ mod $n^2$ of $Z_{n^2}^*$ where g is an element of $Z_{n^2}^*$ whose order is a multiple of n. For a such g, the Paillier encryption function is an isomorphism. Thus, assuming we have s pairs of plaintexts|ciphertexts that generate $Z_n \times Z_n^*$ resp. $Z_{n^2}^*$, the decryption problem of a challenged ciphertext corresponds to the GHI problem with t=1, $G=Z_{n^2}^*$ and $H=Z_n \times Z_n^*$. This application of GHIP to the decryption problem can be adapted to every homomorphic encryption scheme.

Note that Examples 3, 4, 5, 6, 7, 8 include trapdoors in order to interpolate the group homomorphism.

Proof Protocol

Let G, H of order d, A={$(g_1, e_1), \ldots, (g_s, e_s)$} be parameters of a GHI problem. We assume that we have a prover who knows an interpolating group homomorphism f: G→H and wants to convince a verifier in an interactive proof. Let k be an integer. He performs the following interaction with a verifier.

GHIproof$_k$(A)

Parameters: G, H, d

Input: k, A={$(g_1, e_1), \ldots, (g_s, e_s)$}∈G×H

1: The verifier picks $r_i \in G$ and $a_{i,j} \in Z_d$ at random for i=1, ..., k and j=1, ..., s. He computes $u_i = dr_i + a_{i,1}g_1 + \ldots + a_{i,s}g_s$ for i=1, ..., k. He sends $u_1, \ldots, u_k$ to the prover.

2: The prover computes $v_i = f(u_i)$. He sends a commitment $<v_i>$ to $v_1, \ldots, v_k$ to the verifier.

3: The verifier sends all $r_i$'s and $a_{i,j}$'s to the prover.

4: The prover checks that the $u_i$'s computations are correct. He then opens his commitment.

5: The verifier checks that $v_i = a_{i,1}e_1 + \ldots + a_{i,s}e_s$ s for i=1, ..., k.

A commitment scheme can be applied here, e.g. Halevi-Micali commitment scheme.

Theorem 2. Assuming that $g_1, \ldots, g_s$ H-generate an Abelian group G, let d be an integer and $e_1, \ldots, e^s \in H$, where H is an Abelian group of order d. We consider the GHIproof$_k$(A) protocol with A={$(g_1, e_1), \ldots, (g_s, e_s)$}.

i. Assuming that the prover and the verifier are honest, the protocol always succeeds.

ii. Assuming that the commitment scheme is zero-knowledge, the above protocol is zero-knowledge against any verifier.

iii. For any θ>0, assuming that the protocol succeeds with probability greater than $$\frac{1}{p^k}(1+\theta)$$

(where p is the smallest prime factor of d), with a honest verifier, for any ϵ>0 there exists an extractor with a time complexity factor $$O\left(\log\frac{1}{\varepsilon}\right)$$

which can compute an interpolating group homomorphism from the prover with probability at least 1−ϵ.

Proof (sketch). Property i is quite clear. Property ii is proven by constructing a simulator for the transcript of the protocol without the secret of the prover. For this we need to extract a function f out of the prover. We realize that the Verifier information in Step 3 reveals no useful information to the prover because he had to commit to the information he reveals in Step 4. This means that the Prover must be able to compute it even without the information from the Receiver particularly if the commitment is statistically binding. Hence the prover must be able to compute this function $f$.

Theorem 3. Assuming that $x_1, \ldots, x_s$ H-generate an Abelian group G, H is an Abelian group of order d and $y_1, \ldots, y_s \in H$ such that $A = \{(x_1, y_1), \ldots, (x_s, y_s)\}$ interpolates in a group homomorphism between G and $Z_d$. For $B = \{(x_{s+1}, y_{s+1}), \ldots, (x_{s+t}, y_{s+t})\}$ we consider the GHIproof protocol.

i. Assuming that the prover and the verifier are honest, the protocol always succeeds.

ii. Assuming that the commitment scheme is statistically hiding, the above protocol is statistically zero-knowledge against any verifier.

iii. Assuming that the protocol succeeds with probability greater than $$\frac{1}{p^k}$$

(where p is the smallest prime factor of d) with a honest verifier, then B interpolates with A in a group homomorphism.

Signature Scheme

We now describe our undeniable signature scheme.

Public parameters. We let integers k, k', l, s, t be security parameters and "group types" for G and H.

Primitives. We use two deterministic random generators $Gen_1$ and $Gen_2$ and a commitment scheme.

To generate the public and secret key, a particular optional procedure should be used to ensure that the keys comply with the following mechanisms:

1. The signer selects Abelian groups G and H of given type together with a group homomorphism f: G→H. He computes the order d of H. He submits his identity I together with G, H and d to the identity authority.

2. The authority first checks that G and H are of the required type and that d is correct, then picks a random number ρ that is sent to the signer.

3. The signer computes the s first values $(g_1, \ldots, g_s)$ from $Gen_1(\rho)$ and $e_i := f(g_i)$, $i = 1, \ldots s$. He sends $(e_1, \ldots, e_s)$ to the authority. We set $A_g := \{(g_1, e_1), \ldots, (g_s, e_s)\}$. Then the singer interacts in a $GHIproof_{k'}(A_g)$ protocol with the authority in order to prove the validity of the $e_i$'s.

4. Finally, the authority computes a signature C for (I, G, H, d, ρ, $(e_1, \ldots, e_s)$).

The signer should be limited to a few registration attempts to the authority.

Public Key. $K_p = (G, H, d, \rho, (e_1, \ldots, e_s))$, with an optional I, C.

Secret Key. $K_s = f$

Signature generation. A message m is first used in order to generate $x_1, \ldots, x_t$ from $Gen_2(m)$. The signer computes $y_j = f(x_j)$ for $j = 1, \ldots, t$. The signature is $(y_1, \ldots, y_t)$. In other words, this method comprises the following steps:

transforming (see $Gen_2$) the set of data (m) to a sequence of a predetermined number (t) of blocks $(x_1, \ldots, x_t)$, these blocks being members of an Abelian group, this transformation being a one way function, applying to each block $(x_i)$ a group homomorphism (f) to obtain a resulting value $(y_i)$, in which the number of elements of the initial group (G) is larger than the number of elements (d) of the destination group (H).

The fact that the number of elements of the destination group (H) is smaller than the initial group (G) entails that the representation of all elements of the initial group need a larger numeric value than the representation of the destination group.

Taking the example 7: the initial group is $Z_n^*$ where $n = p \times q$, p and q are two prime number of 512 bits. These numbers, have a sufficient size to avoid a retrieval through a factorization of n. The size of the initial group will be about $2^{1024}$.

According to the example 7, we have selected $2^{20} + 7$ as the number of destination elements which is preferably a prime number. The known confirmation and denial protocols were not able to challenge a signature when the number of elements in the initial and destination groups is not the same.

Confirmation Protocol. Compute $g_1, \ldots, g_s$ from the public key, $x_1, \ldots, x_t$ from the message m, run $GHIproof_k(\{(g_i, e_i); i = 1, \ldots, s\} \cup \{(x_j, y_j); j = 1, \ldots, t\})$.

In other words, the confirmation protocol of the undeniable signature $(y_1, \ldots y_t)$ generated above, this signature being confirmed by a Verifier an undeniable signature $(y_1, \ldots, y_t)$ of a message (m) generated by a Signer taking into account a predefined security parameter (k) of the confirmation protocol, this Signer having a public/secret key pair, this method comprising the following steps:

obtaining a personal value (ρ) of the Signer, this personal value being part of the public key (G, H, d, ρ, $(e_1, \ldots e_s)$) of the Signer, extracting a first sequence of elements $(e_1, \ldots, e_s)$ from the public key, generating (see $Gen_1$) a second sequence of elements $(g_1, \ldots g_s)$ from the personal value (ρ), generating a third sequence of elements $(x_1, \ldots, x_t)$ from the message (m), the proof protocol $GHIproof_k$ execute the following steps:

randomly picking challenge parameters $r_i \in G$ and $a_{ij} \in Z_d$ for $i = 1, \ldots, k$ and $j = 1, \ldots, s+t$ (the number of input elements is now extended to s+t) and computing a challenge value $u_i = dr_i + a_{i1}g_1 + \ldots a_{is}g_s + a_{is+1}x_1 + \ldots + a_{is+t}x_t$, sending by the Verifier the challenge value $u_i$ to the Signer, computing by the Signer the response value $v_i = f(u_i)$, calculating by the Signer a commitment value ($<v_i>$) of the response value ($v_i$) and sending it to the Verifier, sending by the Verifier the challenge parameters $r_i$ and $a_{ij}$ to the Signer, verifying by the Signer whether $u_i = dr_i + a_{i1}g_1 + \ldots a_{is}g_s + a_{is+1}x_1 + \ldots + a_{is+t}x_t$, and in the positive event, the Signer opens the commitment on the response value ($v_i$), verifying by the Verifier whether $vi = a_{i1}e_1 + \ldots a_{is}e_s + a_{is+1}x_1 + \ldots a_{is+t}x_t$.

Denial Protocol. Let m be a message and $(z_1, \ldots, z_t)$ be an alleged non-signature. The prover and the signer compute $g_1, \ldots, g_s$ from the public key and $x_1, \ldots, x_t$ from the message. The signer computes the real signature $(y_1, \ldots, y_t)$. We repeat l times the following protocol.

1. The verifier picks $r_j \in G$, $a_{ji} \in Z_d$ for $i = 1, \ldots, s$ $j = 1, \ldots t$, and $a\lambda \in Z_p^*$ where p is the smallest prime dividing d. He computes $$u_j := dr_j + \sum_{i=1}^{s} a_{ji}g_i + \lambda x_j \text{ and } w_j := \sum_{i=1}^{s} a_{ji}e_i + \lambda z_j \text{ for } j = 1, \ldots t.$$

Set $u := (u_1, \ldots, u_t)$ and $w := (w_1, \ldots, w_t)$. He sends u and w to the prover.

2. The prover computes $v_j := f(u_j)$ for $j = 1, \ldots t$. Since $w_i - v_j = \lambda (z_j - y_j)$, he should be able to find λ if the alleged non-signature is really invalid and the verifier is honest. Otherwise, he sets λ to a random value. He then sends a commitment to λ to the verifier.

3. The verifier sends all $r_j$'s and $a_{ji}$'s to the prover.
4. The prover checks that all $r_j$'s and $a_{ji}$'s were generated correctly. He then opens the commitment to λ.
5. The verifier checks that the prover could find the right λ. Otherwise, we stop the protocol and the invalidity of the signature remains undetermined.

In other words, this method consist to deny to a Verifier by a Signer an alleged non-signature $(z_1, \ldots, z_t)$ of a message (m), this signature being intended generated according to the claims 1 to . . . by the Signer, this Signer having a public/secret key pair, this method taking into account a predefined security parameter (l) of the denial protocol and comprising the following steps:

obtaining by the Verifier a personal value (ρ) of the Signer, this personal value being part of the public key (G, H, d, ρ, $(e_1, \ldots e_s)$) of the Signer,
  extracting by the Verifier a first sequence of elements $(e_1, \ldots e_s)$ from the public key,
  generating by the Verifier and the Signer a second sequence of elements $(g_1, \ldots g_s)$ from the personal value (ρ),
  generating by the Verifier and the Signer a third sequence of elements $(x_1, \ldots, x_t)$ from the message (m),
  calculating by the Signer the true signature $(y_1, \ldots, y_1)$,
  repeating the following steps l times, l being the predetermined security parameter,
  randomly picking by the Verifier challenge parameters $r_j \in G$ and $a_{ji} \in Z_d$ for $i=1, \ldots, s$ and $j=1, \ldots, t$ and $\lambda \in Z_p^*$ where p is the smallest prime dividing d,
  computing $u_j := dr_j + a_{j1}g_1 + \ldots a_{js}g_s + \lambda x_j$, and $w_j := a_{j1}e_1 + \ldots a_{js}e_s + \lambda z_j$ for $j=1 \ldots t$,
  sending by the Verifier the challenge values $u_j$ and $w_j$ to the Signer,
  computing by the Signer a response test value $TV_j := (z_j - y_j)$.
  for each $j=1$ to $t$, determining whether the test value $TV_j = 0$, in the negative event, calculating a test parameter $\lambda_j$ according to the following formula: $w_j - v_j = \lambda_j (z_j - y_j)$
  determining an intermediate value IV, this value being equal to one valid test parameter λ and in case of no valid test parameter is found, selecting as intermediate value a random value,
  sending a commitment value CT based on the intermediate value IV, to the Verifier
  sending by the Verifier the challenge parameters $r_j$, $a_{ji}$ and a test parameter λ to the Signer,
  verifying by the Signer whether $u_j = dr_j + a_{j1}g_1 + \ldots a_{js}g_s + \lambda x_j$, and $w_j := a_{j1}e_1 + \ldots a_{js}e_s + \lambda z_j$ for $j=1 \ldots t$ hold, in the positive event, the Signer opens the commitment on the intermediate value (IV) to the Verifier,
  verifying by the Verifier that the test parameter λ is equal to the intermediate value IV.

This denial protocol is inspired from Gennaro et al. [U.S. Pat. No. 6,292,897]. Furthermore, their undeniable signature scheme that is based on RSA corresponds to a special case of our scheme, namely with $G=H=Z_n^*$, $s=t=1$ and the classical RSA signing function as homomorphism f. An other example that is a special case of our scheme is the undeniable signature of D. Chaum [D. Chaum, Zero-Knowledge Undeniable Signatures, Advances in Cryptology—Eurocrypt '90, LNCS 473, pp]. He considered $G=H=Z_p^*$ for a prime p and the homomorphism consisting in raising an element to the power of the private key.

Our setting makes possible to have H substantially smaller than G.

We notice that λ was chosen such that it can be uniquely retrieved for every nonzero values of $Z_d$ that can be taken by the elements $z_j - y_j$'s. Namely, this is done by the following result.

Lemma 1. Let H be an Abelian group of order d, a, b∈H such that b≠0. Let λ be in $\{1, \ldots p-1\}$, where p is the smallest prime dividing d. Then, if the equation $a = \lambda b$ has a solution in λ, then this one is unique.

Even if λ is uniquely determined for a general d, it offers computational advantages to choose d as a prime.

We propose here two variants of the key setup, where the signer can generate the public key by itself. In the first variant, he simply picks a random value ρ in order to generate the s values $(g_1, \ldots, g_s)$ from $Gen_1 (\rho)$ and computes $e_i := f(g_i)$. His public key is (G, H, ρ, $(e_1, \ldots, e_s)$). This variant requires a longer s such that the probability of generating some $g_i$'s that do not H-generate G is sufficiently low.

In the second variant, the signer can drastically reduce the size of s. However, the signer has to be able to solve the following problem in G. For a given $\delta \in G$ and $g_1, \ldots g_s \in G$ that H-generate G, find some elements $$r \in G, a_1, \ldots, a_s \in Z_d \text{ such that } \delta = dr + \sum_{i=1}^{s} a_i g_i.$$

He directly chooses some elements $g_1, \ldots g_s \in G$ that H-generate G and computes the corresponding $e_i$'s. The public key is (G, H, d, $(g_1, \ldots g_s)$, $(e_1, \ldots, e_s)$). Furthermore, the signer has to convince an authority or a verifier that the $g_i$'s really H-generate G. This can be done as follows.

Repeat m times:
1. The prover picks a $\delta_1 \in G$ at random and sends a commitment to $\delta_1$ to the verifier.
2. The verifier picks a $\delta_2 \in G$ at random and sends $\delta_2$ to the prover.
3. The prover computes some coefficients $$r \in G, a_1, \ldots, a_s \in Z_d \text{ such that } \delta_1 + \delta_2 = dr + \sum_{i=1}^{s} a_i g_i.$$

He sends r, $a_i, \ldots a_s$ to the verifier and opens the commitment to $\delta_1$.
4. The verifier checks that $$\delta_1 + \delta_2 = dr + \sum_{i=1}^{s} a_i g_i.$$

really holds.

Note in these variants the signer also have to run a $GHIproof_k$, $((g_1, e_1), \ldots, (g_s, e_s))$ protocol with a verifier (recipient) or an authority. The latter possibility is adequate in order to save some GHIproof run protocols but requires the use of a certificate. A similar remark holds for the above protocol (H-generation of G) as well.

Security Analysis

Theorem 4 (Setup protocol). Let k', k, d, s, G, H, f, $Gen_1$, $Gen_2$ be as in the setup of the above undeniable signature, we have the following security results.

i. Given a prime p, we let $A_p$ be the subgroup of G of all terms whose orders are powers of p. Given p there is a unique $k_p$ and $a_{p1} \leq \ldots \leq a_{pkp}$ sequence such that $A_p$ is isomorphic to $$Z_p^{a_{p1}} \oplus Z_p^{a_{pkp}}.$$

The probability that $g_1, \ldots, g_s \in H$-generate G denoted as $P_{Hgen}$ satisfies $$P_{Hgen} \geq \prod_{p \in P_d} \left(1 - \frac{k_p}{p^s}\right),$$

where $P_d$ is the set of all primes that are factors of gcd(#G, d).

ii. Assuming that the Setup protocol succeeds with probability greater than $$\left(\frac{1}{p} + \theta\right)^k,$$

for $\theta > 0$, then the prover knows the secret key.

Theorem 5. Given k, k', l, d, s, t, G, H, f, $Gen_1$, $Gen_2$, commit as in the above undeniable signature scheme. Assuming that the public key is valid, we have the following security results.

i. If the signer and the verifier are honest, the two protocols are complete: a valid signature will always be accepted by the confirmation protocol, and an invalid signature will always be rejected by the denial protocol.

ii. The scheme resists against existential forgery attacks: provided that $Gen_2$ is a random oracle, if an attacker who has access to the signing oracle and that queries $Q_G$ times $Gen_2$ can later forge new signatures which are valid with probability q, then he can solve the GHI Problem on A={$(g_1, e_1), \ldots, (g_s, e_s)$} successfully with probability q and similar complexity.

iii. The confirmation protocol is sound: if the signer is able to convince a verifier that a given signature is valid with probability $q > p^{-k}$, then the signature is valid.

iv. The confirmation protocol is private: if a prover is able to convince a verifier that a given signature is valid with probability $$q > \left(\frac{1}{p} + \theta\right)^k$$

(where $\theta$ is a constant), then we can extract from him a group homomorphism which solves the GHI Problem with arbitrarily high success probability.

v. The denial protocol is sound: if the signer is able to pass the protocol with probability $q > p^{-l}$, then the alleged signature must be invalid.

vi. The confirmation protocol is zero-knowledge: for any verifier we can build a simulator for the protocol without the secret key.

vii. The denial protocol is zero-knowledge: for any verifier we can build a simulator for the protocol without the secret key.

Proof (Sketch).

i. The assertion i for the confirmation protocol follows from the completeness of $GHIproof_k$. For the denial protocol, the assertion is proved by noticing that there is at least one index j such that $z_j - y_j \neq 0$ and that the prover will find the right $\lambda$.

ii. First, we show that an attacker $\Lambda$ having access to a signing oracle can be simulated by an attacker without this access. Indeed, when $\Lambda$ calls the signing oracle on a message m, the signing oracle will first produce a sequence of t values $x_1, \ldots, x_t \in G$ and then computes $y_i := f(x_i)$ for $i = 1, \ldots, t$. From the point of view of $\Lambda$, this is completely equivalent to dispose of a random source generating pairs of the form (x, f(x)) since $Gen_2$ is modelized as a random oracle. Assuming that the $g_i$'s generate G I dG, we see that this source can be simulated by picking some random $r \in G$, $a_i$'s $Z_d$, computing x: $= dr + a_1 g_1 + \ldots + a_s g_s$ and $f(x) = a_1 e_1 + \ldots a_s e_s$. We denote now $x_1, \ldots x_t$, the challenged elements of the GHI problem. We use our attacker $\Lambda$ in order to compute the $f(x_i)$'s as follows. We simulate $Gen_2$ by computing $$u_i := dr + x_i + \sum_{j=1}^{s} a_{ij} g_j$$

for some random $r \in G$, $a_{ij} \in Z_d$ and $i = 1, \ldots t$. Such $u_i$'s are indistinguishable from some uniformly picked elements in G. By standard proofs we show that forged signatures are necessarily one of the $Gen_2$ queries, so we can deduce $f(x_i)$ from the value $f(u_i)$ for $i = 1, \ldots t$.

iii. This directly comes from Theorem 3 property iii.

iv. This directly comes from Theorem 2 property iii.

v. A cheating prover willing deny a valid signature has to find the value of $\lambda$ at each round of the protocol. Since, $f(u_j) = w_j$, the prover does not learn additional information with $w_j$ and has to find $\lambda$ from $u_j$ uniquely. Similar, as in the proof of property iii he cannot find the $\lambda$ since another distribution of the values $u_j$ with another $\lambda$ is indistinguishable from the first one. Assuming that the commitment scheme is perfectly binding the cheating prover cannot do better than answering a random $\lambda$.

vi. This comes from property ii in Theorem 3.

vii. This is done as in the publication "R. Gennaro, T. Rabin and H. Krawczyk, RSA-Based Undeniable Signatures, Journal of Cryptology, 13, pp".

Various Embodiments and Discussions Thereof

Characters on $Z_n^*$

In this section, we introduce the notion of multiplicative characters and study in particular some special cases in more details. These multiplicative characters are particulars cases of group homomorphism in which the number of elements in the initial group is larger than the destination group and therefore the construction of the claimed undeniable signature applies to these group multiplicative character.

The cases of order 2, 3 and 4 will be exposed in the following subsections.

Definition 1. Let n be an integer. A character $\chi$ on $Z_n^*$ is a map from $Z_n^*$ to C-{0} satisfying $$\chi(ab) = \chi(a)\chi(b) \text{ for all } a, b \in Z_n^*$$

From this definition, we can quickly deduce that $\chi(1) = 1$ and that the value $\chi(a)$ is always a $(\lambda(n))^{th}$ root of the unity for all $a \in Z_n^*$, where $\lambda(n)$ denotes the Carmichael function. We can also define a group structure on the set of characters on $Z_n^*$. In this group, the product (group operation) $\chi_1\chi_2$ of the two characters $\chi_1$ and $\chi_2$ represents the map $a \to \chi_1(a) \chi_2(a)$ and the inverse $\chi^{-1}$ maps each element a to $\chi(a)^{-1}$.

Proposition. Let p be a prime and d an integer such that $d|p-1$.

1. The group of characters defined on $Z_p^*$ is a cyclic group of order $p-1$.

2. The characters on $Z_p^*$ of order dividing d form a cyclic subgroup of order d.

The second part of this proposition is especially interesting for us because we will consider characters of small order (e.g. 2, 3, 4) defined on $Z_n^*$ for n large.

We notice also that a character of order d maps the elements of $Z_p^*$ to the set $\{\zeta_d^j | 0 \leq j \leq d-1\}$ where $\zeta_d$ denotes the unit $e^{2\pi i/d}$ and $i := \sqrt{-1}$.

We provide a way to define certain multiplicative characters on $Z_n^*$ for a n being the product of two special primes. Since $Z_n^*$ is not cyclic, using the above definition to this case is not suitable. Moreover, it is more natural for our purposes to define such characters in the similar way the Jacobi symbol is defined from the Legendre symbol in the case of the quadratic residuosity (or character of order 2). First, assume we are given an integer d and two different primes p, q such that $d|p-1$ and $d|q-1$. From two characters $\chi_1$ and $\chi_2$ of order d defined on $Z_p^*$ respectively $Z_q^*$, we define a character $\eta$ of order d as follows:

$$\eta(a) := \chi_1(a \bmod p) \cdot \chi_2(a \bmod q).$$

For each character $\chi$ of order d we will sometimes associate a logarithm function denoted as $\log_\chi$. For an element $a \in Z_n^*$, we know that $\chi(a)$ is of the form $\zeta_d^j$ for $a \in \{0, 1, \ldots d-1\}$. We define $\log_\chi(a)$ equal to this j.

We present in the following subsections some complements that are specific to the cases d=2, 3, 4. For more details about the theory of this section such as proofs that are omitted, we refer to the book of Ireland and Rosen [K. Ireland and M. Rosen, "A Classical Introduction to Modern Number Theory: Second Edition", Graduate Texts in Mathematics 84, Springer, 1990].

Characters or Order 2

Let p be an odd prime number. By this proposition, we know that there are only two characters of order 2, namely the trivial character $\epsilon$ that maps every elements to 1 and the Legendre symbol. We recall that the Legendre symbol (a/p) for an integer a with (a, p)=1 is 1 if a is congruent to a square modulo p (quadratic residue) and −1 if it is not the case (quadratic non-residue). It turns out that there are as many quadratic residues as non quadratic residues in $Z_p^*$ namely $$\frac{p-1}{2}$$

For an odd integer n, the Jacobi symbol (a/n) for an $a \in Z$ s.t. $(a, n)=1$ is defined as $(a/n) = (a/p1)^{i_1} \cdot (a/p2)^{i_2} \ldots (a/pk)^{i_k}$ where the factorization into primes of n is $p_1^{i_1} \ldots p_k^{i_k}$.

Some additional properties are given below.

Proposition. Let p be an odd prime, $a, b \in Z$ and an odd $n \in Z$. Then

1. $a^{(p-1)/2} \equiv (a/p) \pmod{p}$.

2. $(ab/n) = (a/n)(b/n)$.

3. If $a \equiv b \pmod{n}$, then $(a/n)=(b/n)$.

4. If a and b are odd. Then $(a/b)(b/a) = (-1)^{(a-i)/2 \cdot (b-1)/2}$. (Law of Quadratic Reciprocity)

5. $(2/n) = (-1)^{\frac{p^2-1}{8}}$.

Let consider a modulus n=pq. As we explained at the beginning of this section we define the characters on $Z_n^*$ by multiplying two characters defined on $Z_p^*$ and $Z_q^*$. In this case this simply corresponds to the Jacobi symbol (a/n) or the Legendre symbols (a/p) or (a/q) and the trivial character.

Note also that the properties given in this proposition are used in order to compute the Jacobi symbol in a time complexity of $O(\log(n)^2)$.

Characters of Order 3

Here, we need to introduce a new ring called the ring of Eisenstein integers. Indeed, this ring is the natural structure to study the characters of order 3 or the cubic residuosity.

In what follows, $\omega$ will always denote the complex number $(-1+\sqrt{-3})/2$. We define the ring of the Eisenstein integers as the set $Z[\omega] := \{a+b\omega | a, b \in Z\}$ with the classical operations (addition, multiplication) of C. We notice that $\omega$ is a non trivial cubic root of 1 and satisfies $\omega^2 + \omega + 1 = 0$.

For an element $a \in Z[\omega]$, we define the norm $N(\alpha) = \alpha \bar{\alpha}$, where $\bar{\alpha}$ denotes the complex conjugate of $\alpha$. This is the classical (squared) norm induced by the complex plane. From the definition, we have $$N(a+b\omega) = \left(a - \frac{b}{2}\right)^2 + \frac{3b^2}{4} 4 = a^2 - ab + b^2.$$

It can be shown that $Z[\omega]$ is a unique factorization domain i.e. every elements can be decomposed in a product of irreducible elements uniquely up to a unit element. We can also call the irreducible elements the prime elements of $Z[\omega]$. To avoid some confusion a prime of Z will be called a rational prime if the context is not clear. The units are the invertible elements and in this case all have a norm equal to zero. Hence, the units of $Z[\omega]$ are $\pm 1, \pm \omega, \pm \omega^2$. All prime numbers of $Z[\omega]$ are classified below.

Proposition. The following statements hold and the list of prime of $Z[\omega]$ is exhaustive.

1. Let p be a rational prime such that $p \equiv 1 \pmod{3}$. Then, there exists a prime $\pi$ such that $N(\pi) = \pi \bar{\pi} = p$.

2. If q is a rational prime such that $q \equiv 2 \pmod{3}$, then q is also a prime in $Z[\omega]$.

3. $1-\omega$ is prime and $N(1-\omega)=3$.

The ideal generated by a single element $\sigma \in Z[\omega]$ is denoted by $(\sigma)$ and is equal to $\sigma \cdot Z[\omega]$.

Proposition. Let $\pi$ be a prime in $Z[\omega]$. Then $Z[\omega]/(\pi)$ is a finite field with $N(\pi)$ elements. We can also prove that the set $\{a+b\omega | 0 \leq a, b \leq q\}$ resp. $\{0, 1, 2 \ldots, p-1\}$ form all representatives of the residue class field in the case where $q \equiv 2 \pmod{3}$ resp. $p \equiv 1 \pmod{3}$. We can also prove that for a prime $\pi$ s. t. $N(\pi) \neq 3$ and $\alpha \in Z[\omega]$ s. t. $\alpha \not\equiv 0 \pmod{\pi}$, we have $$\alpha^{\frac{N(\pi)-1}{3}} \equiv \omega^i \pmod{\pi} \text{ for an } i \in \{0, 1, 2\}.$$

This result $\omega^i$ is called the cubic residue character of $\alpha$ modulo $\pi$ and is denoted as $(\alpha/\pi)$ or as $\chi_\pi(\alpha)$. If $\alpha \equiv 0 \pmod{\pi}$, we set $\chi_\pi(\alpha)=0$.

Let $\alpha$ and $\beta$ be in $Z[\omega]$. Suppose the prime factorization of $\beta$ is $$u\prod_{i=1}^{k}\pi_i^{e_i}$$

where $N(\pi_i)\neq 3$ for all $1\leq i\leq k$ and u is a unit. Then the Jacobi-like symbol $(\alpha/\beta)_3$ is defined as $$\prod_{i=1}^{k}(\alpha/\pi_i)_3^{e_i}.$$

In order to formulate the law of cubic reciprocity, we have to introduce the concept of primary. We say that an element $\alpha$ of $Z[\omega]$ is primary iff $\alpha\equiv -1\ (\mathrm{mod}\ 3)$. Note that the term "primary" does not only apply to prime number. Every elements possess exactly one associate that is primary. (An associate of an element $\sigma$ is an element that is of the form $u\sigma$ for a unit u.)

Proposition. Let $\pi$ be a prime s. t. $N(\pi)\neq 3$ and $\alpha$, $\beta$, $\gamma\in Z[\omega]$.

Let $\sigma=3(A+B\omega)-1$ be a primary with A, $B\in Z$.

1. $(\alpha/\pi)_3=1$ iff $x^3\equiv\alpha\ (\mathrm{mod}\ \pi)$ is solvable, i.e., iff $\alpha$ is a cubic residue.
2. $(\alpha\ \beta/\gamma)_3=(\alpha/\gamma)_3(\beta/\gamma)_3$
3. $\alpha\equiv\beta\ (\mathrm{mod}\ \gamma)=>(\alpha/\beta)_3=(\beta/\gamma)_3$.
4. (Law of Cubic Reciprocity) If $\alpha$ and $\beta$ are primary. Then $(\alpha/\beta)_3=(\beta/\alpha)_3$.
5. $(\omega/\sigma)_3=\omega^{A+B}$.
6. $(1-\omega/\sigma)_3=\omega^{2A}$.

We are now in the position to define the characters of order 3 on $Z_p^*$ for a rational prime p and their extensions on a composite modulus that is a Jacobi like symbol. We consider only the case where $p\equiv 1\ (\mathrm{mod}\ 3)$, since the characters are not trivial in this case. Set $p=\pi\overline{\pi}$. Recall first that the field $Z[\omega]/(\pi)$ can be represented by $Z_p^*$ since the set $\{0, 1\ldots p-1\}$ contains all representatives and the multiplications are equivalent in the two cases. Thus, the cubic residue characters $\chi_\pi$ is completely defined on $Z_p^*$. We directly deduce that $\chi_\pi^2$ is another non trivial character of order 3 and is even equal to $\chi_{\overline{\pi}}$ on the rational integers. Let p, q be two different rational primes such that $p\equiv q\equiv 1\ (\mathrm{mod}\ 3)$ and $\pi$, $\sigma\in Z[\omega]$ such that $N(\pi)=p$ and $N(\sigma)=q$. Let $n=pq$, the character on $Z_n^*$ produced by $\chi_\pi$ and $\chi_\sigma$ is denoted by $\chi_{\pi\sigma}$ and is defined as $\chi_{\pi\sigma}(a)=\chi_\pi(a)\cdot\chi_\sigma(a)$. The other characters are defined exactly in the same multiplicative way. There are 8 non trivial characters of order 3 defined on $Z_n^*$, namely $\chi_\pi$, $\chi_{\overline{\pi}}$, $\chi_\sigma$, $\chi_{\overline{\sigma}}$, $\chi_{\pi\sigma}$, $\chi_{\pi\overline{\sigma}}$ and $\chi_{\overline{\pi}\overline{\sigma}}$.

Here, we explain how to find these characters and how they can be computed. The first statement consists of finding a prime $\pi\in Z[\omega]$ such that $N(\pi)=p\equiv 1\ \mathrm{mod}\ 3$ for a rational prime p. We assume here some knowledge on the algorithms of Tonelli and Cornacchia. For a given p, we have to find an element $a+b\omega\in Z[\omega]$ such that $a^2-ab+b^2=p$. This is equivalent to $$\left(a-\frac{b}{2}\right)^2+\frac{3b^2}{4}=p.$$

By introducing the two new variables $$s=a-\frac{b}{2}\ \text{and}\ t=\frac{b}{2},$$

we obtain $s^2+3t^2=p$ for s, $t\in Z$. Now, it suffices to apply the algorithm of Cornacchia to solve this equation in s and t. This algorithm consists of finding an $x\in Z$ such that $x^2\equiv -3\ (\mathrm{mod}\ p)$ (apply algorithm of Tonelli) and then applying the Euclid algorithm to x and p until we get the first rest term $r_n$ such that $r_n^2<p$. A solution is given by setting $s=r_n$.

Suppose we have a character $\chi_\alpha$ where $\alpha$ can be for example $\pi\sigma$ or $\pi\overline{\sigma}$. The computation of a residue character $(\sigma/\alpha)_3$ can be done using a similar technique to the computation of the Jacobi symbol in the context of quadratic residuosity.

Indeed, this consists of reducing $\sigma$ mod $\alpha$ by an Euclidean division in $Z[\omega]$ and then applying the cubic reciprocity law to exchange the two elements of the character. This last step can be done only after having extracted some units in order that a and a become primary. Then by iterating this operation, we reduce the size of the elements involved in the cubic residue character until this one becomes trivial. Note that the asymptotic complexity of the computation is $O(\log(n)^3)$ using standard arithmetic and $O(\log(n)^2)0\log(n)\log\log\log(n))$ using fast arithmetic. This is almost the same magnitude of complexity than the classical Jacobi symbol that is $O(\log(n)^2)$. For more details about this algorithm and its complexity we refer to the article of R. Scheidler [R. Scheidler, "A Public-Key Cryptosystem Using Purely Cubic Fields", Journal of Cryptology, 11, pp. 109-124, Springer, 1998].

Characters of Order 4

Studying the characters of order 4 consists principally of the theory of bi-quadratic residuosity. This one is quite similar to that of cubic residuosity and is done in the ring of Gaussian integers $Z[i]$. A rational prime p of the form $p\equiv 1\ (\mathrm{mod}\ 4)$ is the norm of a prime $\pi$ in $Z[i]$. The field $Z[i]/(\pi)$ has the set of representatives $\{0, 1\ldots p-1\}$ and is identical to $Z_p$. The biquadratic residue character of an $\alpha\in Z[i]$ is defined as $\chi_\pi(\alpha)=i^j$ where $j\in\{0,1,2,3\}$ such that $\alpha^{N(\pi)-1)/4}\equiv i^j\ (\mathrm{mod}\ \pi)$. Moreover, this character generates the two other nontrivial characters of order 4. Note also that the square of $\chi_\pi$ is equal to the quadratic residue character $\chi_p$. We can also define a Jacobi-like symbol in this context similarly to that in the theory of characters of order 3. Moreover, there is also a law of reciprocity in a similarly way as before.

Characters of Higher Orders

It is probably possible to extend our character constructions to some orders greater than 4. Indeed, there is a way to generalize the residuosity to higher orders by introducing a power residue symbol defined on the integers of a cyclotomic field. A general treatment of these cases would be beyond the scope of this paper. Moreover, the computation seems to be more difficult to deal with and the ring of these integers becomes a non unique factorization domain when the order is large. Since such a ring is not a principal ideal domain, we should work with ideals that are generated by more than one element. However, we do not loose the existence of the reciprocity laws, namely there exists a so called Kummer's reciprocity law on some integral ideals of a cyclotomic field (see F. Lemmermeyer, Reciprocity Laws, Monographs in Mathematics, Springer, 2000).

Application on Undeniable Signature

The above described group homomorphism of the undeniable signature scheme is in the context of characters to hard characters, which means a nontrivial character and for d=2 we also exclude the Jacobi symbol $$\left(\frac{\cdot}{n}\right).$$

In a alternative embodiment in the key generation, we have the possibility to avoid the costly generation of primes in the generation of the hard characters (secret key). For d=3 or 4 we can also directly generate $n=\pi\bar{\pi}$ from a random $\pi \in Z[\theta]$ and the hard character is $\chi=(./\pi)_d$. Note that in this case the factorization of n is unknown. In this case, the initial group G will be $Z_n^*$.

Batch Verification

We point out that our scheme allows a batch verification of signatures. Indeed, the confirmation protocol can be easily adapted in order to confirm several signatures at the same time. To this end, the verifier simply computes the $x_i$'s of all messages with $Gen_2$ and continue the protocol as if the $x_i$'s were issued from one signed message.

We have exposed an undeniable signature based on a new problem that is quite general and we have also proved the security of our new scheme. The principal advantage is the size of the signature that can be chosen arbitrarily short. From this general setting we have also proposed a practical example with a 3 bytes signature and a complexity cost which is similar to RSA. We hope that this example will be completed by some various additional settings since group homomorphism are common objects in cryptography. This is let as future work. It would be also interesting to give some different classes of homomorphism for which the Group Homomorphism Interpolation Problem is hard.

The invention claimed is:

1. A method for generating an undeniable signature on a set of data, the method comprising the following steps:
    transforming the set of data to a sequence of a predetermined number of blocks, the blocks being members of an Abelian group, the transformation being a one way function;
    applying to each block a group homomorphism to obtain a resulting value, in which a number of elements of an initial group is larger than the number of elements of a destination group; and
    storing the resulting value in a memory.

2. The method of claim 1, wherein the initial group is formed by invertible integers modulo n, denoted as $Z_n^*$.

3. The method according to claim 2, wherein the group homomorphism computation is based on computation of a residue character ($\chi$) on the set of invertible integers $Z_n^*$.

4. The method according to claim 3, wherein the residue character ($\chi$) computation in based on a parameter ($\pi$) serving as a key.

5. The method according to the claim 4, wherein this key parameter ($\pi$) is determined by: $\pi \cdot \bar{\pi} = n$, $\bar{\pi}$ being the complex conjugate of $\pi$.

6. The method according to claim 4, wherein the parameter is a secret key on an asymmetric key pair public/secret.

7. The method according to claim 2, wherein the group homomorphism computation is determined by raising an element of $Z_n^*$ to the power of $r(q-1)$, in which $n=p \cdot q$ such that $p=rd+1$ and q are prime, $\gcd(r, d)=1$, $\gcd(q-1, d)=1$, then by computing a discrete logarithm.

8. The method according to claim 7, wherein the group homomorphism is calculated using a factorization of n.

9. The method according to claim 1, wherein the length of the signature is dependent of the number of elements of the destination group and the number of blocks.

10. A method of confirming by a Verifier an undeniable signature $(y_1, \ldots, y_t)$ of a set of data (m) generated by a Signer taking into account a predefined security parameter of the confirmation protocol, this Signer having a public/secret key pair, this method comprising the following steps:
    obtaining a personal value ($\rho$) from the Signer, this personal value being part of the public key (G, H, d, $\rho$, $(e_1, \ldots e_s)$) of the Signer;
    extracting a first sequence of elements $(e_1, \ldots e_s)$ from the public key,
    generating a second sequence of elements $(g_1, \ldots g_s)$ from the personal value ($\rho$),
    generating a third sequence of elements $(x_1, \ldots, x_t)$ from the set of data (m);
    randomly picking challenge parameters $r_i \in G$ and $a_{ij} \in Z_d$ for $i=1, \ldots, k$ and $j=1, \ldots, s+t$ and computing a challenge value $u_i = dr_i + a_{i1}g_1 + \ldots a_{is}g_s + a_{is+1}x_1 + \ldots + a_{is+t}x_t$;
    sending by the Verifier the challenge value $u_j$ to the Signer;
    receiving from the Signer a commitment value ($<v_i>$), this commitment value ($<v_i>$) being calculated by the Signer based on a response value $v_i = f(u_i)$;
    sending by the Verifier the challenge parameters $r_i$ and $a_{ij}$ to the Signer;
    verifying by the Signer whether $u_i = dr_i + a_{i1}g_1 + \ldots a_{is}g_s + a_{is+1}x_1 + \ldots + a_{is+t}x_t$, and in a positive event, opening by the Signer the commitment on the response value ($v_i$); and
    verifying by the Verifier whether $v_i = a_{i1}e_1 + \ldots a_{is}e_s + a_{is+1}x_1 + \ldots + a_{is+t}x_t$.

11. A method for denying to a Verifier by a Signer on an alleged non-signature $(z1, \ldots, zt)$ of a set of data (m), this signature being supposedly generated according to claim 1 by the Signer, this Signer having a public/secret key pair, this method taking into account a predefined security parameter (l) of the denial protocol and comprising the following steps:
    obtaining by the Verifier a personal value ($\rho$) of the Signer, this personal value being part of the public key (G, H, d, $\rho$, $(e_1, \ldots e_s)$) of the Signer;
    extracting by the Verifier a first sequence of elements $(e_1, \ldots e_s)$ from the public key;
    generating by the Verifier and the Signer a second sequence of elements $(g_1, \ldots g_s)$ from the personal value ($\rho$);
    generating by the Verifier and the Signer a third sequence of elements $(x_1, \ldots, x_t)$ from the set of data (m);
    calculating by the Signer the true signature $(y_1, \ldots, y_t)$; and
    repeating the following steps l times, l being the predetermined security parameter;
    randomly picking by the Verifier challenge parameters $r_j \in G$ and $a_{ji} \in Z_d$ for $i=1, \ldots, s$ and $j=1, \ldots, t$ and $\lambda \in Z_p^*$ where p is the smallest prime dividing d;
    computing $u_j := dr_j + a_{j1}g_1 + \ldots a_{js}g_s + \lambda x_j$, and $w_j := a_{j1}e_1 + \ldots a_{js}e_s + \lambda z_j$ for $j=1 \ldots t$;
    sending by the Verifier the challenge values $u_j$ and $w_j$ to the Signer;
    computing by the Signer a response test value $TV_j := (z_j - y_j)'$;
    for each $j=1$ to t, determining whether the test value $TV_j = 0$;
    in a negative event, calculating a test parameter $\lambda_j$ according to the following formula: $w_j - v_j = \lambda_j(z_j - y_j)$;

determining an intermediate value (IV), the intermediate value (IV) being equal to one valid test parameter ($\lambda$) and in case of no valid test parameter is found, selecting as the intermediate value (IV) a random value;

sending a commitment value CT based on the intermediate value (IV), to the Verifier;

sending by the Verifier the challenge parameters $r_j$, $a_{ji}$ and test parameter ($\lambda$) to the Signer;

verifying by the Signer whether $u_j = dr_j + a_{j1}g_1 + \ldots a_{js}g_s + \lambda x_j$ and $w_j := a_{j1}e_1 + \ldots a_{js}e_s + \lambda z_j$ for $j = 1 \ldots t$ hold, in a positive event, the Signer opens the commitment on the intermediate value (IV) to the Verifier; and verifying by the Verifier that the test parameter ($\lambda$) is equal to the intermediate value (IV).

12. The method of claim 11, in which the determination of the valid test parameter comprises a check whether $(w_j - v_j)$ and $(z_j - y_j)$ are not equal to 0.

13. The method of claim 11, in which $j > 1$, the determination of the valid test parameter comprises the check whether $(w_j - v_j)$ and $(z_j - y_j)$ are not equal to 0, and that all of the test parameters are the same.

* * * * *

UNITED STATES PATENT AND TRADEMARK OFFICE
CERTIFICATE OF CORRECTION

PATENT NO.         : 7,461,261 B2                                          Page 1 of 1
APPLICATION NO. : 10/777661
DATED              : December 2, 2008
INVENTOR(S)        : Serge Vaudenay et al.

It is certified that error appears in the above-identified patent and that said Letters Patent is hereby corrected as shown below:

On the Title Page

Item "(73) Assignee: Ecole Polytechnique Federale de Lausanne (EPEL), Lausanne (CH)"

should read:

Item --(73) Assignee: Ecole Polytechnique Federale de Lausanne (EPFL), Lausanne (CH)--

Signed and Sealed this

Twenty-fourth Day of March, 2009

JOHN DOLL
*Acting Director of the United States Patent and Trademark Office*